J. S. KILPATRICK.
FEED MIXER.
APPLICATION FILED APR. 1, 1908.
913,399.
Patented Feb. 23, 1909.
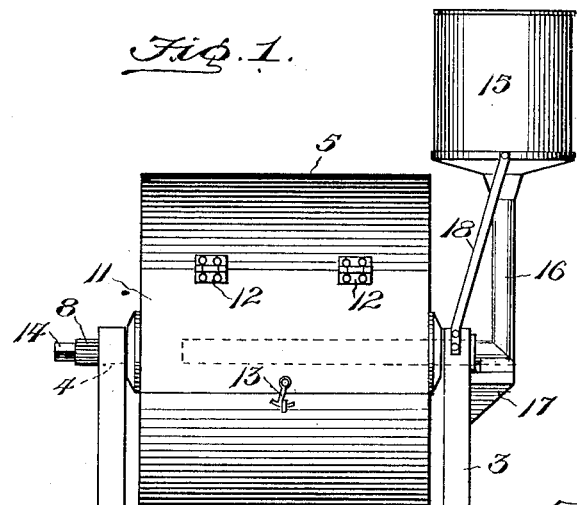
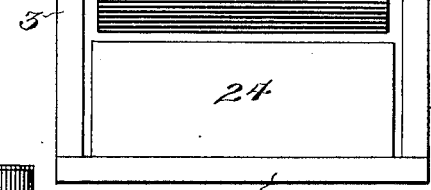
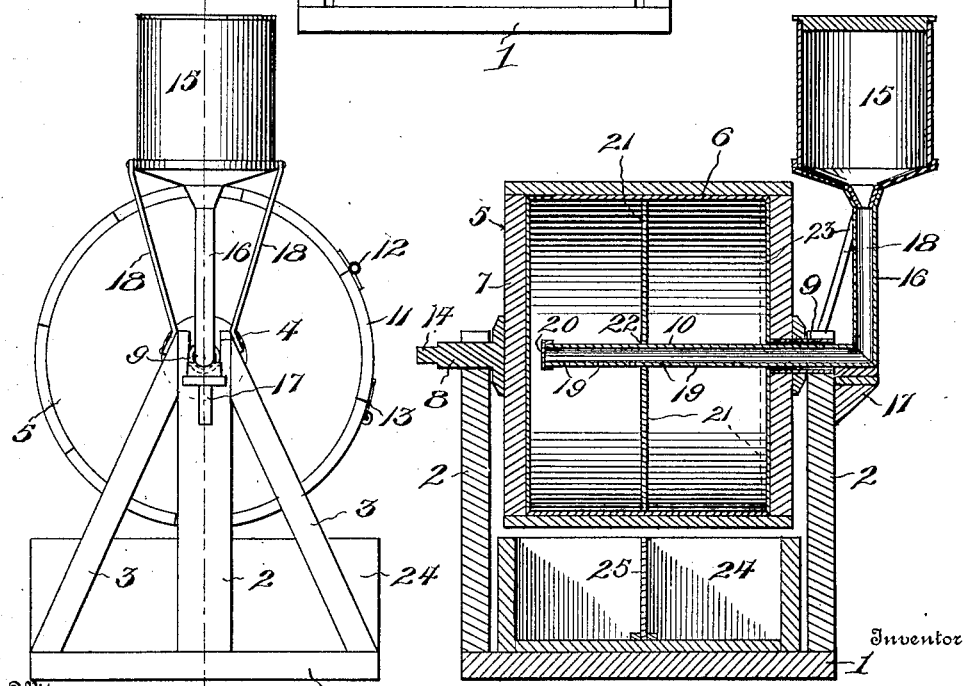
Witnesses
J. T. L. Wright
C. Bradway
Inventor
James S. Kilpatrick
By Victor J. Evans
Attorney
THE NORRIS PETERS CO., WASHINGTON, D. C.

UNITED STATES PATENT OFFICE.

JAMES S. KILPATRICK, OF WOODSTOWN, NEW JERSEY.

FEED-MIXER.

No. 913,399.      Specification of Letters Patent.      Patented Feb. 23, 1909.

Application filed April 1, 1908. Serial No. 424,596.

*To all whom it may concern:*

Be it known that I, JAMES S. KILPATRICK, a citizen of the United States, residing at Woodstown, in the county of Salem and State of New Jersey, have invented new and useful Improvements in Feed-Mixers, of which the following is a specification.

This invention relates to a feed mixer of the rotary drum type in which the materials can be thoroughly mixed either in a wet or dry state, as desired.

The invention has for one object to improve and simplify the construction of devices of this character so as to be comparatively easy and inexpensive to manufacture, thoroughly reliable in use, and convenient to manipulate.

A further object of the invention is the provision of a mixing device comprising a rotary drum into which extends a perforated tube for supplying water to moisten the material being mixed, the tube being connected with a reservoir supported on the frame of the machine at a convenient point to permit the water to flow by gravity, there being a box disposed under the drum into which the mixed material can be emptied.

With these objects in view and others, as will appear as the description proceeds, the invention comprises the various novel features of construction and arrangement of parts which will be more fully described hereinafter and set forth with particularity in the claims appended hereto.

In the accompanying drawing, which illustrates one of the embodiments of the invention, Figure 1 is a front view of the device. Fig. 2 is an end view. Fig. 3 is a central longitudinal section.

Similar reference characters are employed to designate corresponding parts throughout the several views.

Referring to the drawing, A designates the frame of the machine that comprises a base 1 and standards 2, held rigid by braces 3. The upper end of the standards 2 are provided with vertically extending notches 4 that form bearings for the journals of the drum. The drum 5 is cylindrical and of any desired size and has a zinc or other suitable lining 6. Secured to the head 7 is a journal 8 that rests in one of the bearings 4 and the opposite head has a tubular journal 9 that rests in the other bearing 4, the tubular journal serving to receive the water supply or tube 10 that extends into the drum. The drum is provided with a door 11 mounted to swing open on hinges 12 and held closed by a hook and eye fastening 13. The journal 8 has a squared portion 14 for the reception of a crank whereby the drum can be turned by hand or a pulley whereby the drum can be turned by power.

To supply water to the drum, a reservoir or tank 15 is supported on the frame A at a suitable point to permit the water to flow by gravity and the bottom of the tank is connected by a vertical tube 16 with the outer end of the horizontal tube 10, there being a bracket 17 on the frame A directly below the vertical tube. The tank is held in upright position by braces 18 that are secured at the lower ends to the frame and at the upper ends to the tank. The portion of the tube 10 disposed within the drum is provided with perforations 19 that discharge the water into the drum in the form of jets and the inner end of the tube is closed by a cap 20.

It is sometimes desirable to mix two kinds of feed at once and for this purpose, the drum 6 is provided with a partition 21 that has a central aperture 22 through which the tube 10 extends and this partition is freely slidable on the tube, so that when the mixer is to be used for mixing only one kind of feed, the partition can be moved to one end of the drum as shown by dotted lines at 23. Resting on the bottom 1 of the frame A is a trough 24 into which the contents of the drum can be dumped by first swinging the door 11 open and then turning the drum so that the opening thereof will be lowermost, thus permitting the mixed feed to drop out. In the box 24 may be arranged a partition 25 which can be adjusted so as to aline with the partition 21 in the drum, and thereby prevent the two kinds of feed from mixing when dropped into the box.

In practice, to supply the material to the drum, the latter is turned so that the opening thereof will be uppermost to enable the material to be dumped into the same. If a dry mixture is to be produced, no water is placed into the tank 15, and by rotating the drum, the material will become thoroughly mixed, and after the operation is completed, the door 11 is opened while the drum is held in position with its opening lowermost. The material will then drop out into the box 24 that can be carried off to feed the stock, poultry or the like. When a wet mixture is required, a suitable quantity of water is placed in the tank 15 so that water will discharge into the mixer and moisten the material therein.

From the foregoing description, taken in connection with the accompanying drawing, the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative and that such changes may be made when desired, as are within the scope of the claims.

Having thus described the invention, what I claim is:

1. In a machine of the class described, the combination of a supporting frame, a drum mounted for rotation, a water supply pipe extending into the drum, a partition supported on the water supply pipe, and a door for the drum extending from one end of the drum to the other, in combination with separate means for receiving the material from opposite sides of the partition when the door is opened for discharging such material.

2. In a machine of the class described, the combination of a supporting frame, a rotary drum thereon, a water supply pipe leading into the drum, a partition slidably mounted on the supply pipe and held by the latter in a plane transverse to the axis of rotation, a door for the drum and extending to both sides of the partition whereby the latter maintains the materials separated during the emptying of the drum, and means for receiving material from the drum.

In testimony whereof, I affix my signature in presence of two witnesses.

JAMES S. KILPATRICK.

Witnesses:
WILLIAM D. BUGLEY,
ENOCH S. FOGG.